US012251718B2

(12) United States Patent
Fayed et al.

(10) Patent No.: US 12,251,718 B2
(45) **Date of Patent: *Mar. 18, 2025**

(54) AERATED HYDROCYCLONE APPARATUS AND METHOD FOR CYCLONIC FROTH SEPARATION

(71) Applicant: Narmer-engsim LLC, Blacksburg, VA (US)

(72) Inventors: Hassan Elhady Hassan Mohamed Fayed, Blacksburg, VA (US); Heba Ahmed ELsaid Abdelrahman Elsewidy, Blacksburg, VA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/154,369

(22) Filed: Jan. 13, 2023

(65) Prior Publication Data

US 2023/0158515 A1 May 25, 2023

Related U.S. Application Data

(63) Continuation of application No. 17/166,557, filed on Feb. 3, 2021, now Pat. No. 11,583,868.

(Continued)

(51) Int. Cl.

*B04C 5/103* (2006.01)
*B04C 5/081* (2006.01)

(Continued)

(52) U.S. Cl.

CPC .............. *B04C 5/103* (2013.01); *B04C 5/081* (2013.01); *B04C 5/10* (2013.01); *B03D 1/1425* (2013.01); *B04C 2009/008* (2013.01)

(58) Field of Classification Search

None

See application file for complete search history.

(56) References Cited

U.S. PATENT DOCUMENTS 3,391,787 A 7/1968 Salomon
3,489,680 A 1/1970 Snavely, Jr.

(Continued)

FOREIGN PATENT DOCUMENTS

SU 1607960 A 11/1990

OTHER PUBLICATIONS

SU 1607960 machine translation (Year: 1990).*
PCT International Search Report and Written Opinion for Application No. PCT/US2021/042371, mailed Oct. 28, 2021.

*Primary Examiner* — Peter Keyworth
(74) *Attorney, Agent, or Firm* — Edmond DeFrank

(57) ABSTRACT

Apparatus and methods configured for cyclonic froth separation are disclosed. Exemplary implementations may: provide slurry into a first volute; provide fluid communication between the first volute and an interior of a porous barrier; receive pressurized gaseous fluid through a body wall to an exterior of the porous barrier; provide fluid communication between the exterior of the porous barrier and the interior of the porous barrier; facilitate flows of pressurized gas through the porous barrier; receive outputted froth and output froth to the exterior of the apparatus; provide fluid communication between the interior of the porous barrier and the second volute; retain froth within the interior of the porous barrier; receive slurry exhausted from the interior of the porous barrier; provide fluid communication of exhausted slurry to the exterior of the apparatus.

20 Claims, 4 Drawing Sheets

Related U.S. Application Data

(60) Provisional application No. 63/062,332, filed on Aug. 6, 2020.

(51) Int. Cl.

| | |
|---|---|
| ***B04C 5/10*** | (2006.01) |
| *B03D 1/14* | (2006.01) |
| *B04C 9/00* | (2006.01) |

(56) References Cited

U.S. PATENT DOCUMENTS

| | | | | |
|---|---|---|---|---|
| 4,399,027 | A | 8/1983 | Miller | |
| 4,399,028 | A | 8/1983 | Kile | |
| 4,997,549 | A | 3/1991 | Atwood | |
| 5,192,423 | A | 3/1993 | Duczmal | |
| 6,146,525 | A | 11/2000 | Li | |
| 8,267,381 | B2 | 9/2012 | Schneider | |
| 2009/0152204 | A1 * | 6/2009 | Chantrel | E21B 43/34 210/512.1 |
| 2022/0040710 | A1 | 2/2022 | Fayed | |

* cited by examiner

AERATED HYDROCYCLONE APPARATUS AND METHOD FOR CYCLONIC FROTH SEPARATION

FIELD OF THE DISCLOSURE

The present disclosure relates to an aerated hydrocyclone apparatus and method for cyclonic froth separation.

BACKGROUND

Hydrocyclones for separation of particles and liquids are known however existing devices present issues with clogging of the device during execution of the separation process and relatively high hydrodynamic loss due to unrecovered kinetic energy. A device may perform the particle separation process until the device has been clogged, thereby rendering the device unable to perform separation until user intervention is applied to unclog the device. An apparatus to prevent clogging of the device not appear to be known in the art.

SUMMARY

One aspect of the present disclosure relates to an aerated hydrocyclone apparatus to separate particles from a slurry. The apparatus may include a cylindrical central body. The central body may be formed by a body wall. The body wall being hollow and including a first opening on one end of the body wall and a second opening on the end opposite of the first body opening. The central body may include a pressured fluid port. The pressurized fluid port may be configured to receive pressurized gaseous fluid to generate a hydrocyclone within the apparatus. The central body may house a porous barrier. The porous barrier may run longitudinally from a first primary barrier opening at one end of the porous barrier to a second primary barrier opening at the end opposite of the first primary barrier opening. The porous barrier may be housed in the central body such that the longitudinal axis of the porous barrier is generally parallel to the longitudinal axis of the central body. The porous barrier may include secondary barrier openings. The second barrier openings may facilitate flows of pressurized gaseous fluid through the porous barrier in directions that have a common directional tangential component. The directions of flow of the pressurize gas may enhance cyclonic motion of the slurry within the interior of the porous barrier. The apparatus may contain a first volute. The first volute may include a first body interface. The first body interface may attach to the first body opening to form a first cyclonic opening. The first cyclonic opening may provide fluid communication between the first volute and the interior side of the porous barrier. The first volute may include a slurry input port. The slurry input port may provide flows of slurry into the first volute. The slurry may then flow through the first cyclone opening into the interior side of the porous barrier to be separated by the hydrocyclone formed within the interior side of the porous barrier. The first volute may include a froth output port. The froth overflow port may be configured to receive froth outputted from hydrocyclone through the first cyclone opening and to output the froth from the apparatus. The apparatus may include a second volute. The second volute may include a body interface. The body interface may be attached to the second body opening to form a second cyclonic opening. The second cyclonic openings may provide fluid communication between the second volute and the interior side of the porous barrier. The second volute may include an air column base that forms a base surface at the second primary barrier opening to retain froth within the core of hydrocyclone. The base surface and a wall of the second volute may form an exhaust opening that is generally annular in shape. The exhaust opening may be configured to receive slurry exhausted from the hydrocyclone. The second volute may include an exhaust port. The exhaust port may be configured to provide fluid communication of slurry between the exhaust opening and the exterior of the apparatus.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTIONS OF THE DRAWINGS

DETAILED DESCRIPTION

Figure 1A:
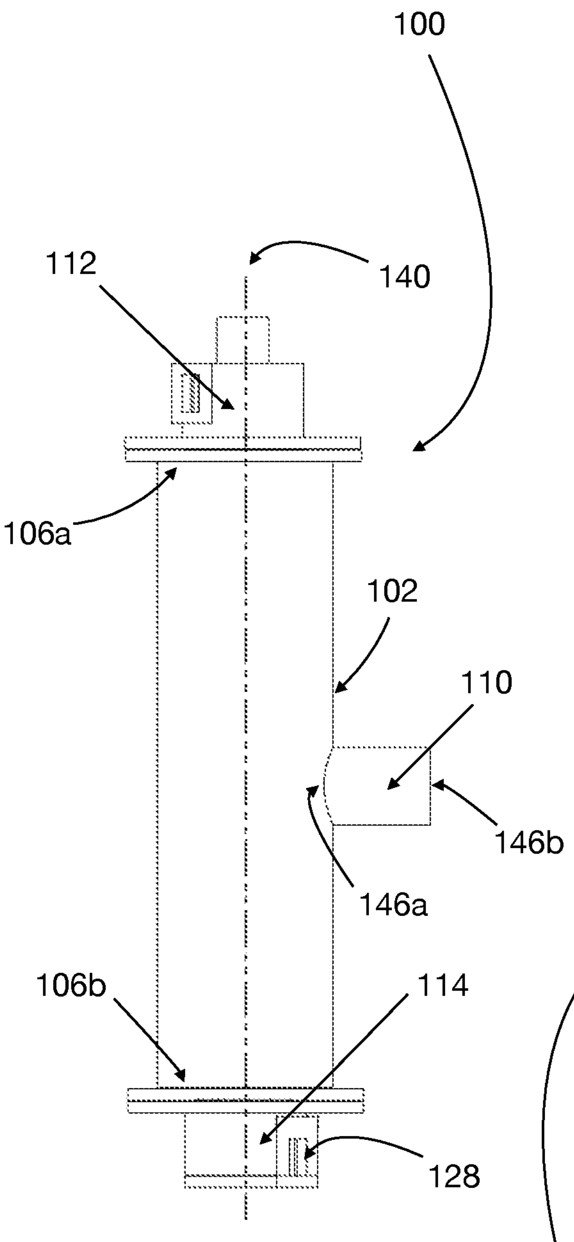
FIG. 1A illustrates an aerated hydrocyclone apparatus configured for cyclonic froth separation, in accordance with one or more implementations.
Figure 1B:
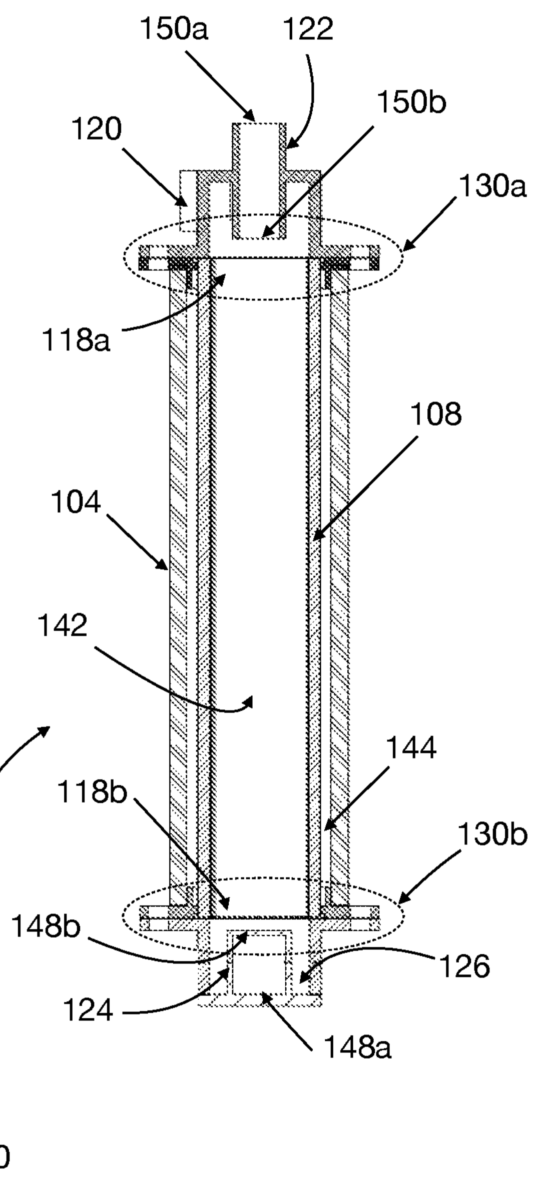
FIG. 1B illustrates a cross-sectional view of the apparatus that is parallel to the longitudinal axis of the central body, in accordance with one or more implementations.

FIGS. 1A and 1B illustrates an aerated hydrocyclone apparatus 100 configured for cyclonic froth separation of particles from a slurry, in accordance with one or more implementations. FIG. 1A illustrates a view of the exterior of apparatus 100. FIG. 1B illustrates a cross sectional view of apparatus 100, parallel to the longitudinal axis 140 of apparatus 100 (depicted by the dotted line of FIG. 1A). In some implementations, apparatus 100 may include one or more components. The components may include one or more of a central body 102, a porous barrier 108, a pressurized fluid port 110, a first volute 112, a second volute 114, and/or other components. Central body 102 may be formed of a body wall 104. In some implementations, body wall 104 may be hollow and run longitudinally from a first body opening 106*a* to a second body opening 106*b*. Second body opening 106*b* may be the end of body wall 104 opposite to first body opening 106*a*. In some implementations, porous barrier 108 may be housed inside central body 102. Porous barrier 108 may run longitudinally from a first primary barrier opening 118*a* to a second primary barrier opening 118*b*. Second primary barrier opening 118*b* may be the end of porous barrier 108 opposite to first primary barrier opening 118*a*. First volute 112 may include one or more of a slurry input port 120, a froth overflow port 122, and/or other components. Second volute 114 may include one or more of an airbase column 124, an exhaust opening 126, an exhaust port 128, and/or other components.

In some implementations, body wall 104 may have a generally cylindrical shape. Body wall may run longitudinally from first body opening 106*a* to second body opening 106*b*. In some implementations, first body opening 106*a* may have one or more of a circular shape, an oval shape, and/or other shapes. In some implementations second body opening 106*b* may have one or more of a circular shape, an oval shape, and/or other shapes. The length of central body 102 may run from first body opening 106*a* to second body opening 106*b* and/or may be determined by the length of body wall 104. The diameter of central body 102 may be determined by the shape and/or size of first body opening 106*a* and/or second body opening 106*b*.

Referring to FIG. 1A, pressurized fluid port 110 may be configured to receive pressurized gaseous fluid through body wall 104. In some implementations, pressurized fluid port 110 may be positioned along body central body 102 between first body opening 106*a* and second body opening 106*b*. In some implementations, pressurized fluid port 110 may be positioned at one or more of midway between first body opening 106*a* and second body opening 106*b*, closer to first body opening 106*a* and further from second body opening 106*b*, further from first body opening 106*a* and closer to second body opening 106*b*, and/or at other positions.

In some implementations, pressurized fluid port 110 may be formed by one or more of a tube structure, a pipe structure, a channel structure and/or other structures. By way of non-limiting example, a tube structure forming pressurized fluid port 110 may run longitudinally from a first port opening 146*a* on one end of the tube structure to a second port opening 146*b* on an end opposite first port opening 146*a*. By way of non-limiting example, FIG. 1A shows pressurized fluid port 110 may be positioned on central body 102 such that longitudinal axis 140 of central body 102 is generally perpendicular to the longitudinal axis of pressurized fluid port 110. In some implementations, first port opening 146*a* may be positioned on an interior side 144 of the body wall 104. In some implementations, second port opening 146*b* may be configured to attach to an external source containing pressurized gaseous fluid. By way of non-limiting example, pressurized gaseous fluid may flow from the external source through second port opening 146*b*, through first port opening 146*a*, and into the interior side 144 of body wall 104.

In some implementations, the diameter of pressurized fluid port 110 may be smaller or larger, wherein the size of the diameter may determine the amount of pressurized gaseous fluid flowing into the interior side 144 of body wall 104. In some implementations, the diameter of pressurized fluid port 110 may be smaller or larger, wherein the size of the diameter may determine the pressure of flowing pressurized gaseous fluid. In some implementations, pressurized fluid port 110 may include one or more of a pressure gauge to indicate the pressure of the gaseous fluid within pressurized fluid port 110, and/or other components.

Referring to FIG. 1B, porous barrier 108 may be housed within central body 102. Porous barrier may be positioned within central body 102 on the interior side 144 of body wall 104. In some implementations, the longitudinal axis of porous barrier 108 may be generally parallel to the longitudinal axis 140 of central body 102. By way of non-limiting example, the longitudinal axis of porous barrier 108 is shown to be generally parallel to the longitudinal axis 140 of central body 102. In some implementations, the misalignment of the longitudinal axis of porous barrier 108 and longitudinal axis 140 of central body 102 may vary within a range of 0 to 10 degrees. In some implementations, the length of porous barrier 108 from first primary barrier opening 118*a* to second primary barrier opening 118*b* may be generally the same as the length of body wall 104 from first body opening 106*a* to second body opening 106*b*. In some implementations, the longitudinal axis 140 of central body 102 may be the same as the longitudinal axis for porous barrier 108. In some implementations, a hydrocyclone may be house on an interior side 142 of porous barrier 108. The hydrocyclone may be formed of a central air column surrounded by an outer layer of spiraling slurry. In some implementations, the length and diameter of porous barrier 108 may determine the flow rate of the layer of spiraling slurry.

Figure 2A:
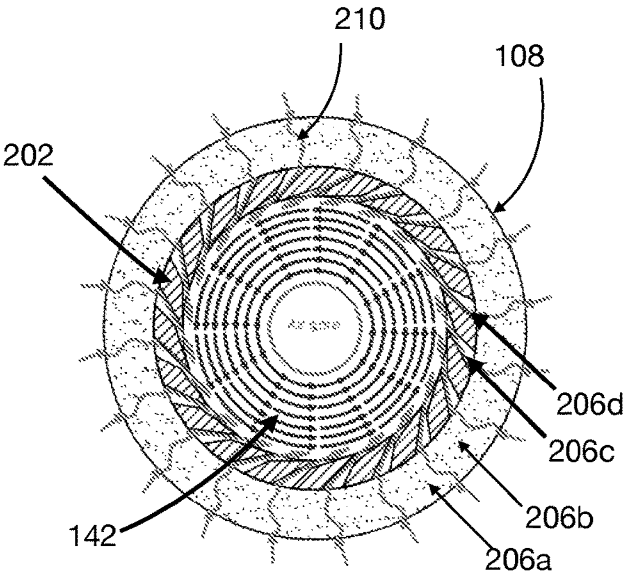
FIG. 2A illustrates a cross-sectional view of the apparatus that is perpendicular to the longitudinal axis of the central body, in accordance with one or more implementations.
Figure 2B:
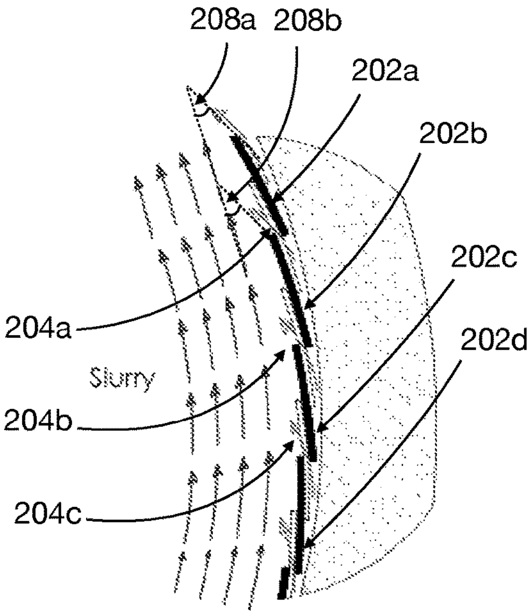
FIG. 2B illustrates a close-up view of a cross section of the apparatus that is perpendicular to the longitudinal axis of the central body, in accordance with one or more implementations.

Referring to FIGS. 2A and 2B porous barrier 108 may include a cascade of blades 202 (also referred to as a set of blades). The cascade of blades 202 may be formed by one or more of individual blades 202*a-d* and/or other components. In some implementations the individual blades 202*a-d* of cascade of blades 202 may be overlapping. By way of non-limiting example, the cascade of blades 202 may be formed with a first edge of blade 202*a* positioned between a second edge of blade 202*b* and the porous barrier 108. The first edge of blade 202*b* may be positioned between a second edge of blade 202*c* and porous barrier 108. The first edge of blade 202*c* may be positioned between a second edge of blade 202*d* and porous barrier 108. In some implementations, one or more of the second edge of blade 202*a*, the second edge of 202*b*, the second edge of 202*c*, the second edge or 202*d*, and/or other components may contact porous barrier 108. In some implementations, cascade of blades 202 may form one or more of blade openings 204*a-c* between a first edge of an individual one of blades 202 and a second edge of an adjacent individual one of blades 202. By way of non-limiting example, FIG. 2B illustrates a blade opening 204*a* between the second edge of blade 202*a* and the first edge of blade 2020*b*. In some implementations, blade openings 204*a-c* may provide communication of pressurized gaseous fluid from the exterior side of porous barrier 108 through porous barrier 108 to the interior side 142 of porous barrier 108.

Referring to FIG. 2A, porous barrier 108 may include one more of secondary barrier openings 206*a-d* and/or other components. Secondary barrier openings 206*a-d* may be formed by one or more of, one or more pores of porous barrier 108, one or more blade openings 204*a-c*, and/or other formations. By way of non-limiting example, secondary barrier openings 206*a* and 206*b* may be formed by straight micro-channels and/or a network of micro-pores of porous barrier 108. Secondary barrier openings 206*c* and 206*d* may be the same as blade openings 204*a* and 204*b*, respectively. In some implementations, secondary barrier openings 206*a*-*d* may provide fluid communication of pressurize gaseous fluid between the exterior of porous barrier 108 and the interior side 142 of porous barrier 108. By way of non-limiting example, pressurized gaseous fluid may flow from the exterior of porous barrier 108, through one or more secondary barrier openings 206*a*-*d* to the interior side 142 of porous barrier 108. By way of non-limiting example, trajectory arrows 210 may exemplify the path of pressurized gaseous fluid from the exterior of porous barrier 108 into the interior side 142 of porous barrier 108.

In some implementations, pressurized gaseous fluid may be injected into the hydrocyclone through one or more of secondary openings 206*a*-*d*. Pressurized gaseous fluid may enter the interior side 142 of porous barrier 108 at a direction with a common directional tangential component. The common directional tangential component may be defined by an angle of injection 208*a*-*b*. The angle of injection 208*a*-*b* may be determined by the direction of the cyclonic motion of slurry of the hydrocyclone and/or the position of the individual blades 202*a*-*d* that form blade openings 104*a*-*c*. In some implementations, the angle of injection 208*a*-*b* may be the same for all points at which pressurized gaseous fluid enters the interior side 142 of porous barrier 108. The angle of injection 208*a*-*b* may be generally tangential to the cyclonic motion of slurry on the interior side 142 of porous barrier 108.

In some implementations, the pressurized gaseous fluid may flow from the secondary barrier openings and penetrate the outer layer of spiraling slurry of the hydrocyclone house on the interior side 142 of porous barrier 108. In some implementations, the injection of pressurized gaseous fluid may induce additional spiraling of the outer layer of slurry of the hydrocyclone on the interior side 142 of porous barrier 108.

In some implementations, the cascading direction of the set of blades 202 may prevent slurry from contacting the porous material forming porous barrier 108. By way of non-limiting example, FIG. 2B illustrates the direction of slurry motion on the interior side 142 of porous wall 108 and/or the overlapping edges of individual blades 202*a*-*d* may prevent the slurry from entering blade openings 204*a*-*c*. The cyclonic force on the interior side 142 of porous barrier 108 may cause the slurry to flow over the blade openings 204*a*-*c*, rather than into the blade openings. Preventing slurry from flowing into the blade openings 204*a*-*c* may prevent large particles within the slurry from clogging the porous material forming porous barrier 108.

Figure 3:
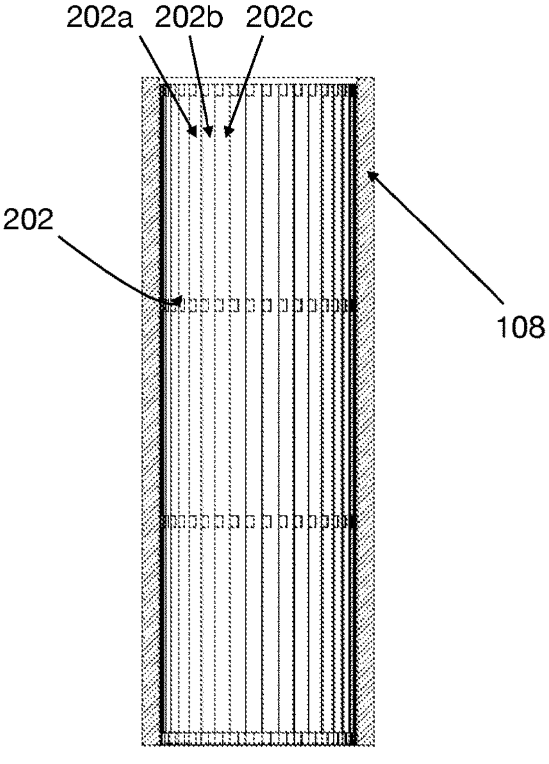
FIG. 3 illustrates a porous barrier for an aerated hydrocyclone apparatus, in accordance with one or more implementations.

Referring to FIG. 3, the cascade of blades 202 may be formed by one or more of individual ones of blades 202*a*-*d* arranged in a generally cylindrical shape. In some implementations the individual blades of the cascade of blades 202 may run longitudinally from the first primary barrier opening to the second primary barrier opening of porous barrier 108. In some implementations, the individual blades of cascade of blades 202 may include more or less blades in its circumference. In some implementations, porous barrier 108 may include one or more cascades of blades. By way of non-limiting example, FIG. 3 illustrates porous barrier 108 with one cascade of blades 202, however other implementations may include one or more rows of cascades of blades and/or one or more layers of cascades of blades on the interior side 142 of porous barrier 108.

Figure 4:
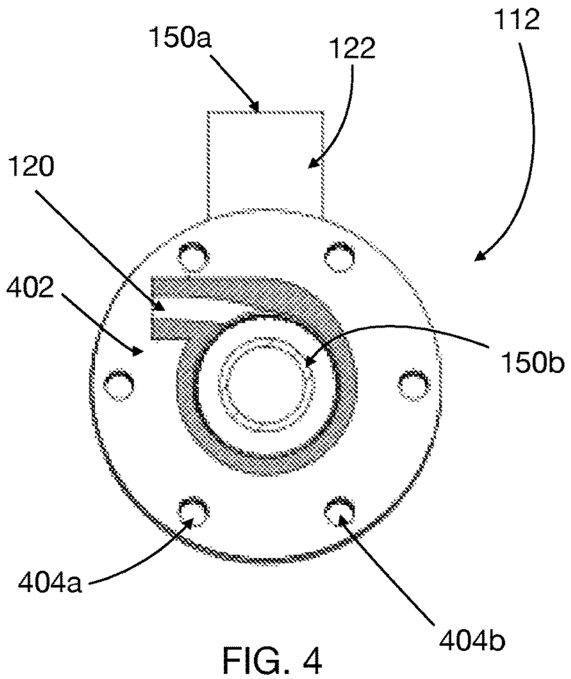
FIG. 4 illustrates a first volute for an aerated hydrocyclone apparatus, in accordance with one or more implementations.

Referring to FIG. 4, first volute 112 may include slurry input port 120. In some implementations, slurry input port 120 may provide fluid communication between the exterior of apparatus 100 and first volute 112. In some implementations, slurry input port 120 may be formed by one or more of a tube structure, a pipe structure, a channel structure, and/or other structures. In some implementations, slurry input port 120 may be configured to attach to an external source containing slurry. In some implementations, slurry may enter first volute 112 at a direction that is tangential to the cyclonic motion of the layer of spiraling slurry of the hydrocyclone on the interior side 142 of porous barrier 108. In some implementations, the angle at which slurry flows through slurry input port 120 into first volute 112 may be determined by the position of slurry input port 120 on first volute 112. In some implementations, the momentum at which slurry is injected through slurry input port 120 may initiate the spiraling of the slurry as it forms the outer layer of the hydrocyclone housed on the interior side 142 of porous barrier 108.

Referring to FIG. 4, first volute 112 may include a body interface 402. In some implementations, first volute 112 may attach to central body 102 by body interface 402 contacting with first body opening 106*a*. Body interface 402 may contact first body opening 106*a* to form a first cyclonic opening 130*a* (indicated by a dashed circle in FIG. 1B). In some implementations, slurry may flow from first volute 112 through first cyclonic opening 130*a* into the interior side 142 of porous barrier 108. Slurry may flow into and/or be incorporated into the outer layer of spiraling slurry of the hydrocyclone formed on the interior side 142 of porous barrier 108. In some implementations, the outer layer of spiraling slurry within the hydrocyclone may be further propelled into cyclonic motion by pressurized gaseous fluid flowing from the secondary barrier openings 206*a*-*d* of porous barrier 108.

In some implementations body interface 402 may have one or more of a circular shape, an oval shape, and/or other shapes. In some implementations, body interface 402 may have a generally similar shape to first body opening 106*a*. In some implementations body interface 402 may have a generally similar diameter to first body opening 106*a*. In some implementations, body interface 402 may include one or more of body interface bolt openings 404*a*-*b*. Body interface bolt openings 404*a*-*b* may be configured to house one or more components to attach body interface 402 to first body opening 106*a*. By way of non-limiting example, body interface bolt openings 404*a*-*b* may be configured to house one or more of a nut and bolt and/or other mechanisms for attachment.

Referring to FIG. 4, first volute 112 may include froth overflow port 122. In some implementations, froth overflow port 122 may provide fluid communication from first volute 112 to the exterior of apparatus 100. Froth overflow port 112 may be formed of a tube structure, a pipe structure, a channel structure, and/or other structures. In some implementations, froth overflow port 122 may run longitudinally from a first output opening 150*a* to a second output opening 150*b* on the end opposite from the first output opening. In some implementations, first volute 112 may attach to central body 102, such that the longitudinal axis of froth output port may be generally parallel with the longitudinal axis of central body 102. In some implementations, first volute 112 may be attached to central body 102, such that the second output opening 150*b* of froth overflow port 122 may be positioned longitudinally above the central air column of the hydrocyclone on the interior side of porous barrier 108. In some implementations, the first output opening 150*a* of froth overflow port 122 may be configured to attach to an exterior component to house the outputted froth.

In some implementations, froth formed by the hydrocyclone may collect in the central air column of the hydrocyclone on the interior side 142 of porous barrier 108. In some implementations, froth in the central air column may flow in a direction toward froth overflow port 122. In some implementations, froth may flow from the interior side 142 of porous barrier 108 through first cyclonic opening 130*a* into first volute 112. The froth may flow from first volute 112 to the exterior of apparatus 100 via froth overflow port 122. In some implementations, the length of froth overflow port 122 may be smaller or larger and may determine the amount and/or speed of froth outputted by apparatus 100. In some implementations, the diameter of the tube structure forming froth overflow port 122 may be smaller or larger and may determine the amount and/or speed of froth outputted by apparatus 100.

Figure 5A:
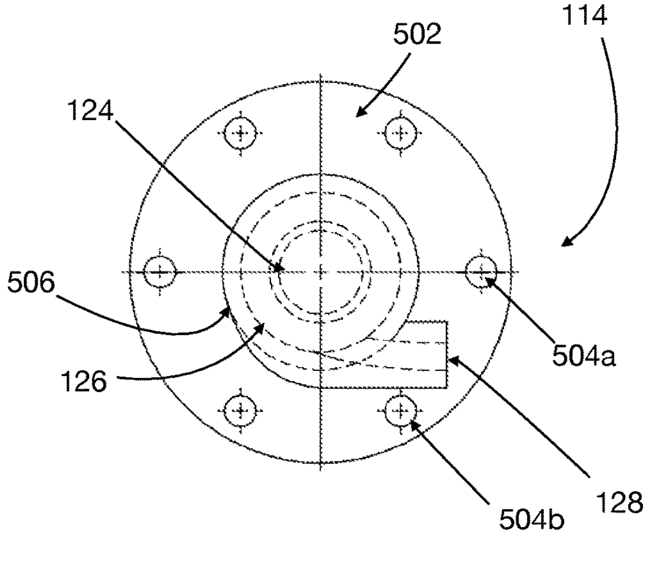
FIG. 5A illustrates a second volute for an aerated hydrocyclone apparatus, in accordance with one or more implementations.
Figure 5B:
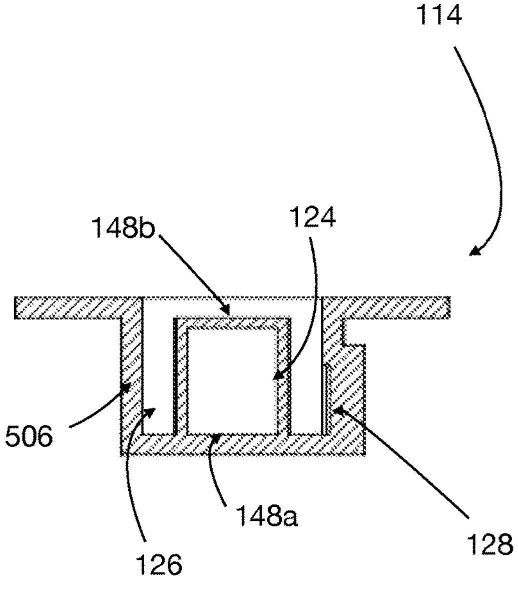
FIG. 5B illustrates a cross-sectional view of a second volute for an aerated hydrocyclone apparatus, in accordance with one or more implementations.

Referring to FIG. 5A, second volute 114 may include a body interface 502. In some implementations, second volute 114 may attach to central body 102 by body interface 502 contacting with second body opening 106*b*. Body interface 502 may contact with second body opening 106*b* to form a second cyclonic opening 130*b* (indicated by a dashed circle in FIG. 1B). In some implementations, slurry exhausted by the hydrocyclone may flow from the interior side 142 of porous barrier 108 through second cyclonic opening 130*b* into second volute 114.

In some implementations body interface 502 may have one or more of a circular shape, an oval shape, and/or other shapes. In some implementations, body interface 502 may have a generally similar shape to second body opening 106*b*. In some implementations body interface 502 may have a generally similar diameter to first body opening 106*b*. In some implementations, body interface 502 may include one or more of body interface openings 504*a-b*. Body interface openings 504*a-b* may be configured to house one or more components to attach body interface 502 to first body opening 106*b*. By way of non-limiting example, body interface openings 504*a-b* may be configured to house one or more of a nut and bolt and/or other mechanisms for attachment.

Referring to FIG. 5A, second volute 114 may include air base column 124. In some implementations air base column 124 may be configured to support the central air column of the hydrocyclone on the interior side 142 of porous barrier 108. In some implementations, the central air column may be formed longitudinally from the first cyclonic opening 130*a* to the second cyclonic opening 130*b*. In some implementations, air base column 124 may be configured to prevent froth formed in the central air column from being outputted by exhaust port 128. In some implementations air base column 124 may be formed by a cylindrical structure. The cylindrical structure may include a base end 148*a* and a base surface 148*b* opposite the base end 148*a*. The base end 148*a* of the cylindrical structure may contact with a base of second volute 114. The base surface 148*b* of air base column 124 may extend to second cyclonic opening 130*b*. In some implementations, the diameter of air base column 124 may be slightly larger than the diameter of the central air column formed on the interior side 142 of porous barrier 108.

In some implementations, the base surface 148*b* of air base column 124 may contact the central air column formed on the interior side 142 of porous barrier 108 in the second cyclonic opening 130*b*. In some implementations, air base column 124 may prevent air from the central air column to be outputted through exhaust port 128. In some implementations, air column base 124 may decrease the loss of kinetic energy and/or increase the cyclonic force of the hydrocyclone on the interior side 142 of porous barrier 108.

Referring to FIG. 5A, second volute 114 may include exhaust opening 126. In some implementations, exhaust opening 126 may be formed by a wall 506 of volute 114 and air base column 124. In some implementations exhaust opening 126 may have a generally annular shape and may extend from the base of second volute 114 to second cyclonic opening 130*b*. In some implementations, the space forming exhaust opening 126 may be determined by the size and/or shape of airbase column 124 and/or the wall of second volute 114. In some implementations, exhaust opening 126 may be configured to provide fluid communication between second cyclonic opening 130*b* and exhaust output port 128. By way of non-limiting example, slurry in cyclonic motion on the interior side 142 of porous barrier 108 may also flow longitudinally from first cyclonic opening 130*a* to second cyclonic opening 130*b*. Slurry may flow through from the interior side 142 of porous barrier 108 through second cyclonic opening 130*b* into second volute 114 via the exhaust opening 126. In some implementations, slurry on the interior side 142 of porous barrier may flow in cyclonic motion around the central air column.

Referring to FIG. 5A, second volute 114 may include exhaust port 128. In some implementations, exhaust port 128 may provide fluid communication between second volute 114 and the exterior of apparatus 100. In some implementations, exhaust port 128 may be formed by one or more of a tube structure, a pipe structure, a channel structure, and/or other structures. In some implementations, exhaust port 128 may be formed at the base of second volute 114 and/or may be formed in the wall 506 of second volute 114. In some implementations, exhaust port 128 may be configured to attach to an external component to house outputted slurry. In some implementations, slurry may flow into second volute 114 via exhaust opening 126. Slurry may flow from exhaust opening 126 through exhaust port 128 to the exterior of apparatus 100. In some implementations, the length and/or diameter of the tube structure forming exhaust port 128 may be smaller or larger and may determine the rate at which slurry is outputted from apparatus 100.

Figure 6:
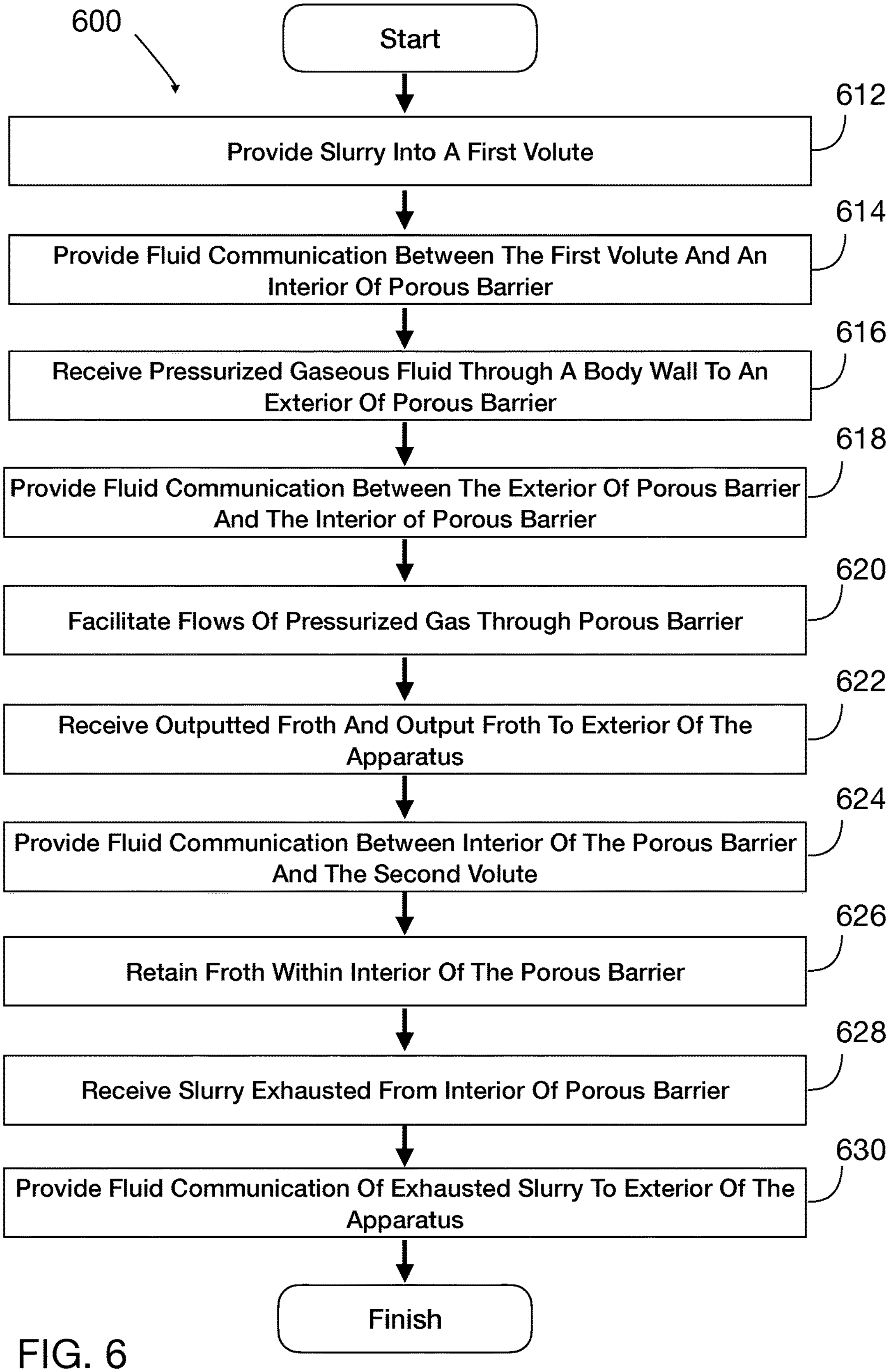
FIG. 6 illustrates a method for cyclonic froth separation of particles from a slurry, in accordance with one or more implementations.

FIG. 6 illustrates a method for cyclonic froth separation of particles from a slurry. The operations of method 600 presented below are intended to be illustrative. In some implementations, method 600 may be accomplished with one or more additional operations not described (i.e. slurry conditioning), and/or without one or more operations discussed. Additionally, the order in which the operations are illustrated in FIG. 6 and described below is not intended to be limiting.

An operation 612 may include providing slurry, via a slurry input port, into a first volute. Operation 612 may be performed by one or more components that is the same or similar to slurry input port 120, in accordance with one or more implementations.

An operation 614 may include providing fluid communication between the first volute and the interior of a porous barrier to be separated by the hydrocyclone formed therein. Operation 614 may be performed by one or more components that is the same or similar to first cyclonic opening 130*a*, in accordance with one or more implementations.

An operation 616 may include receiving pressurized gaseous fluid through a body wall to an exterior of the porous barrier. The pressurized gaseous fluid being provided may generate the hydrocyclone on the interior of the porous barrier. Operation 616 may be performed by one or more components that is the same or similar to pressurized fluid port 110, in accordance with one or more implementations.

An operation 618 may include providing fluid communication between the exterior of a porous barrier and the interior of the porous barrier. Operation 618 may be performed by one or more components that is the same or similar to secondary barrier openings 206*a-d*, in accordance with one or more implementations.

An operation 620 may include facilitating flows of pressurized gas through the porous barrier in directions that have a common directional tangential component to the longitudinal axis of the porous barrier to enhance cyclonic motion of the hydrocyclone formed within the interior of the porous barrier. Operation 620 may be performed by one or more components that is the same or similar to secondary barrier openings 206*a-d*, in accordance with one or more implementations.

An operation 622 may include receiving outputted froth from the hydrocyclone formed in the interior of the porous barrier and outputting the froth to the exterior of the apparatus. Operation 622 may be performed by one or more components that is the same or similar to froth overflow port 122, in accordance with one or more implementations.

An operation 624 may include providing fluid communication between the interior of the porous barrier and the second volute. Operation 624 may be performed by one or more components that is the same or similar to second cyclonic opening 130*b*, in accordance with one or more implementations.

An operation 626 may include retaining froth within the interior of the porous barrier. Operation 626 may be performed by one or more components that is the same or similar to air base column 124, in accordance with one or more implementations.

An operation 628 may include retaining receiving exhausted slurry interior of the porous barrier. Operation 628 may be performed by one or more components that is the same or similar to exhaust opening 126, in accordance with one or more implementations.

An operation 630 may include providing fluid communication of exhausted slurry from the exhaust opening to the exterior of the apparatus. Operation 630 may be performed by one or more components that is the same or similar to exhaust port 128, in accordance with one or more implementations.

Although the apparatus(es) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A hydrocyclone apparatus configured to separate particles from a slurry, the apparatus comprising:

a central body formed by a body wall, wherein the body wall runs longitudinally from a first body opening at one end to a second body opening at another end opposite the first body opening;

a porous barrier coupled to the body wall forming an outer layer of the body wall, wherein the porous barrier allows air or gas flows from a secondary barrier opening to flow through the porous barrier and then between one or more rows of cascades of blades forming an inner layer on an interior side of the porous barrier;

a first volute connected to the first body opening having a first slurry input port forming a first cyclonic opening, a body interface coupled to the first volute and that is attached to the first cyclonic opening that is configured to allow a fluid flow of slurry with particles to the interior of the central body, wherein the particles are separated from the slurry by a froth created by a hydrocyclone formed therein, wherein a central air column is formed within a core of the hydrocyclone;

an air base column coupled to the central air column configured to support the air column and isolate the core having low pressure from a high pressure region near the body wall of the hydrocyclone to prevent the froth from being outputted by an exhaust port;

a second volute connected to the second body opening having a second slurry input port forming a second cyclonic opening, including a body interface coupled to the second volute attached to the second cyclonic opening configured to allow a fluid flow of residual slurry to the interior of the central body and the second volute, an interior wall of the second volute configured to form an exhaust opening configured to receive residual particles to flow residual particles matter to the exhaust port coupled to the second volute configured to allow fluid flows of captured particles matter to the exterior of the apparatus, wherein the air base column allows during operation of the hydrocyclone slurry flows to be expelled from the hydrocyclone apparatus via the exhaust port.

2. The apparatus of claim 1, wherein the one or more rows of cascades of blades on the interior side of the porous barrier are configured to prevent large particles within the slurry from clogging the porous barrier material.

3. The apparatus of claim 1, further comprising a slurry froth formed by the hydrocyclone configured to collect in the central air column of the hydrocyclone to capture particles suspended in the slurry on the interior side of porous barrier.

4. The apparatus of claim 1, wherein the porous barrier coupled to the central body is aligned parallel to the longitudinal axis of the central body.

5. The apparatus of claim 1, wherein the exhaust opening of the central air column configured to receive slurry exhausted from the hydrocyclone and allow the exhausted slurry to flow to an exterior of the hydrocyclone apparatus.

6. The apparatus of claim 1, further comprising a mechanism to attach the second volute to a second body opening of the central body.

7. A method for separating particles from a slurry, the method comprising:

providing slurry, via a slurry input port, into a first volute;

providing fluid flow of slurry, via a first cyclonic opening, between the first volute and an interior of a central body to be separated by a hydrocyclone formed therein, a central a core of the hydrocyclone the central body being formed of a body wall that runs longitudinally from a first body opening at one end to a second body opening at another end opposite the first body opening, the first cyclonic opening being formed by a body interface of the first volute being connected to the first body opening of the central body;

providing a porous barrier coupled to the body wall forming an outer layer of the body wall, wherein the porous barrier allows air or gas flows from a secondary barrier opening to flow through the porous barrier through the porous barrier and then between one or more rows of cascades of blades forming an inner layer of the body wall on an interior side of the porous barrier;

providing fluid flow, via a second cyclonic opening, between the interior of the central body and a second volute, the second cyclonic opening being formed by a body interface of the second volute connected to the second body opening of the central body;

receiving, via an exhaust opening of the second volute, exhausted slurry from the interior of the central body, the exhaust opening formed by the base surface and an interior wall of the second volute, the exhaust opening is generally annular in shape; providing, via an exhaust port of the second volute, fluid flow of exhausted slurry from the exhaust opening to the exterior of the apparatus;

preventing froth formed in the central air column from being outputted by the exhaust port using an air base column coupled to the central air column to support the central air column and isolate the core having low pressure from the high pressure region near the body wall of the hydrocyclone; and retaining, via an air base column, air to support the hydrocyclone formed within the interior of the central body, the air base column forming a base surface at the second cyclonic opening, wherein the air base column has a diameter similar to a diameter of the central air column of the hydrocyclone so that during operation of the hydrocyclone slurry flows from the interior of the central body to the exhaust opening to be expelled from the apparatus via the exhaust port.

8. The method of claim 7, further comprising receiving, via a overflow port, outputted froth and/or concentrates from the hydrocyclone formed in the interior of the central body and outputting the froth and/or concentrates to the exterior of the central body, the overflow port is positioned along the longitudinal axis of the central body on the first volute.

9. The method of claim 7, wherein forming the first cyclonic opening includes creating a connection of the body interface of the first volute to the first body opening of the central body.

10. The method of claim 7, further comprising attaching the first volute to the first body opening of the central body using a mechanismtudinal axis of the central body, the attachment opening has a generally circular shape.

11. The method of claim 7, further comprising the body interface of the second volute including an attachment opening opposite from the exhaust opening on the longitudinal axis of the central body, the attachment opening has a generally circular shape.

12. The method of claim 7, further comprising attaching the second volute to the second body opening of the central body with a mechanism.

13. A hydrocyclone direct cyclonic flotation apparatus configured to separate particles from a slurry, the apparatus comprising:

a central body formed by a body wall, wherein the body wall runs longitudinally from a first body opening at one end to a second body opening at another end opposite the first body opening;

a first volute connected to the first body opening having a first slurry input port forming a first cyclonic opening, a body interface coupled to the first volute and attached to the first cyclonic opening configured to allow a fluid flow of slurry with particles to the interior of the central body, wherein the particles are separated from the slurry by a froth created by a hydrocyclone formed therein, wherein a central air column is formed within a core of the hydrocyclone;

an air base column coupled to the central air column configured to support the air column and isolate the core having low pressure from a high pressure region near the body wall of the hydrocyclone to prevent the froth from being outputted by an exhaust port;

one or more of secondary openings coupled to the body wall configured to inject a pressurized gaseous fluid into the interior of the body wall;

a porous barrier coupled to the body wall forming an outer layer of the body wall, wherein the porous barrier allows air or gas flows from a secondary barrier opening to flow through the porous barrier and then between one or more rows of cascades of blades forming an inner layer on an interior side of the porous barrier;

a second volute connected to a second body opening having a second slurry input port forming a second cyclonic opening;

a second body interface coupled to the second volute attach to the second cyclonic opening configured to allow a fluid flow of residual slurry to the interior of the central body;

an interior wall of the second volute configured to form an exhaust opening configured to receive residual particles to flow residual particles matter to the exhaust port coupled to the second volute configured to allow fluid flows of captured particles matter to the exterior of the apparatus; and a central pipe coupled to the second volute configured for indirect froth cyclonic flotation hydrocyclone, to allow a fluid flow of a froth concentrate of captured particles and remaining particles in the slurry through the central pipe to exit the apparatus through the exhaust opening in the second volute.

14. The apparatus of claim 13, wherein the fluid flow of slurry enters the hydrocyclone through the first volute tangentially to the hydrocyclone and swirls through it.

15. The apparatus of claim 13, wherein the slurry swirling in the hydrocyclone generates a radial pressure distribution where maximum pressure occurs at the peripheral wall of the hydrocyclone and minimum pressure occurs at the core along the centerline of the hydrocyclone.

16. The apparatus of claim 13, further comprising a slurry input port coupled at one terminal to an external source containing slurry, wherein the slurry enters the first volute at a direction tangential to the cyclonic motion of the layer of swirling slurry of the hydrocyclone on the interior side of porous barrier.

17. The apparatus of claim 13, wherein the one or more of secondary openings coupled to the body wall have an angle to the porous barrier configured to inject a pressurized gaseous fluid generally tangential to the swirling slurry on the interior side of the porous barrier.

18. The apparatus of claim 13, further comprising a pressurized gaseous fluid configured to be injected through the body wall of hydrocyclone and flow through the porous barrier and between the cascades of blades, wherein the cascades of blades is configured to feed gaseous fluid at certain flux rate at a surfaces of the cascades of blades to break the pressurized gaseous fluid stream and generates bubbles so that the bubbles are dragged by the slurry to flow towards the core.

19. The apparatus of claim 13, wherein the cascades of blades are further configured to generate pressurized gaseous fluid bubbles that collide and attach to the particles and create a froth layer near and around the core.

20. The apparatus of claim 13, further comprising an overflow pipe coupled to the first volute configured to direct flotation to allow the froth and separated particles to exit the hydrocyclone apparatus, wherein a remainder of the slurry flows through an exhaust port coupled to the second volute to exit the hydrocyclone apparatus and further configured for indirect flotation, wherein the apparatus is comprising an overflow pipe coupled to the second volute to allow the froth and separated particles to exit the hydrocyclone apparatus, wherein a remainder of the slurry flows through the exhaust port coupled to the second volute to exit the hydrocyclone apparatus.

* * * * *